United States Patent
Seo

(10) Patent No.: US 8,336,086 B2
(45) Date of Patent: Dec. 18, 2012

(54) AUTHENTICATION METHOD USING ICON PASSWORD

(75) Inventor: Hyung Su Seo, Gyeonggi-Do (KR)

(73) Assignee: RSupport Co., Ltd., Seoul (KR)

( * ) Notice: Subject to any disclaimer, the term of this patent is extended or adjusted under 35 U.S.C. 154(b) by 941 days.

(21) Appl. No.: 12/081,718

(22) Filed: Apr. 21, 2008

(65) Prior Publication Data

US 2010/0011419 A1    Jan. 14, 2010

(30) Foreign Application Priority Data

Jan. 14, 2008  (KR) .................. 10-2008-0003986

(51) Int. Cl.
*H04L 29/06* (2006.01)
(52) U.S. Cl. ............... 726/5; 726/27; 726/28; 713/182; 713/184
(58) Field of Classification Search .................. None
See application file for complete search history.

(56) References Cited

U.S. PATENT DOCUMENTS

| | | | |
|---|---|---|---|
| 6,209,104 B1 * | 3/2001 | Jalili | 726/18 |
| 7,574,739 B2 * | 8/2009 | Shirakawa | 726/19 |
| 8,117,458 B2 * | 2/2012 | Osborn et al. | 713/183 |
| 2005/0071637 A1 * | 3/2005 | Shirakawa | 713/170 |
| 2005/0188226 A1 * | 8/2005 | Kasatani | 713/201 |
| 2006/0218408 A1 * | 9/2006 | Serpa | 713/183 |
| 2007/0277224 A1 * | 11/2007 | Osborn et al. | 726/2 |
| 2009/0038006 A1 * | 2/2009 | Traenkenschuh et al. | 726/21 |
| 2009/0077653 A1 * | 3/2009 | Osborn et al. | 726/17 |
| 2010/0250937 A1 * | 9/2010 | Blomquist et al. | 713/170 |
| 2011/0029436 A1 * | 2/2011 | Norvell et al. | 705/67 |
| 2011/0047605 A1 * | 2/2011 | Sontag et al. | 726/7 |
| 2011/0184804 A1 * | 7/2011 | Sontag et al. | 705/14.49 |
| 2011/0202982 A1 * | 8/2011 | Alexander et al. | 726/7 |
| 2012/0011564 A1 * | 1/2012 | Osborn et al. | 726/2 |
| 2012/0023574 A1 * | 1/2012 | Osborn et al. | 726/19 |

\* cited by examiner

*Primary Examiner* — Eleni Shiferaw
*Assistant Examiner* — Jeffery Williams
(74) *Attorney, Agent, or Firm* — Edwards Wildman Palmer LLP

(57) ABSTRACT

A method of authenticating a user of a terminal operating a server and connected to the terminal through a communication network, in which a password needed for authentication is inputted as icons, rather than numerals or characters, thereby preventing leakage or theft of the password. Through the present invention, security is improved in processing a password in an information processing device or a communication network, and furthermore, leakage of the password is fundamentally prevented in the process of inputting the password by a user. Therefore, an effect of securing reliability of the overall authentication process may be obtained.

5 Claims, 10 Drawing Sheets

Fig. 7

| Unique value | 1 | 2 | 3 | 4 | 5 | 6 | 7 | 8 | 9 | * | 0 | # |
|---|---|---|---|---|---|---|---|---|---|---|---|---|
| Icon | 🚌 | ✿ | ✈ | 📖 | ☎ | ✋ | ☆ | ⛵ | 🏠 | 🐦 | 🚶 | ✎ |
| | 🚗 | ❀ | ✈ | 📕 | ☏ | 👌 | ★ | 🚢 | 🏡 | 🦢 | 🚶 | ✏ |
| | 🚙 | ❁ | ✈ | 📘 | 📞 | ✌ | ★ | 🛳 | 🏘 | 🐦 | 🧍 | ✒ |

Fig. 8

| Feature | Feature value | Icon | | | | |
|---|---|---|---|---|---|---|
| Animal | 0 | 🐘 | 🦌 | 🦢 | 🦈 | ⚠ |
| Plant | 1 | 🌲 | 🍁 | 🌹 | ✿ | 🌴 |
| Human | 2 | 🧍 | 👥 | ❗ | 🚶 | ⚠ |
| Food | 3 | 🍴 | 🍞 | 🍦 | 🍸 | 🍽 |
| Weather | 4 | 🌡 | ❄ | ☁ | ⛅ | ☂ |
| Transportation | 5 | 🚕 | 🚌 | 🚢 | ⛵ | ✈ |
| Sky | 6 | 🌙 | 🦅 | ☁ | ⛅ | ✈ |
| Sea | 7 | ⚓ | 🏝 | 🐟 | 🚤 | ⛵ |
| Building | 8 | 🏠 | 🏙 | 🏛 | 🏢 | 🏭 |
| Signboard | 9 | 🛑 | ➡ | ⚠ | ⚠ | 🍽 |

Fig. 9
| Icon | Feature | | Feature value | |
|---|---|---|---|---|
|  | Animal | Sky | 0 | 6 |
|  | Animal | Sea | 0 | 7 |
|  | Animal | Signboard | 0 | 9 |
|  | Plant | Sea | 1 | 7 |
|  | Human | Signboard | 2 | 9 |
|  | Food | Signboard | 3 | 9 |
|  | Weather | Sky | 4 | 6 |
|  | Weather | Sky | 4 | 6 |
|  | Transportation | Sea | 5 | 7 |
|  | Transportation | Sea | 5 | 7 |
|  | Transportation | Sky | 5 | 6 |

Fig. 11

| Feature | Weather | Animal | Sea | Sky |
|---|---|---|---|---|
| Password (Feature value) | 4 | 0 | 7 | 6 |
| Feature value list | 0, 4, 6, 7 | | | |

⇩

| Unique value | | 0 | 1 | 2 | 3 | 4 | 5 | 6 | 7 | 8 | 9 | Classification |
|---|---|---|---|---|---|---|---|---|---|---|---|---|
| Single icon | | 🐘🦌 | 🌲🍁🌹👤🍀 | 👤👥👤👫 | 🛏️📷🍸 | 🌡️❄️☂️ | 🚕🚐 | 🌙 | ⚓ | 🏠🏙️🏛️🏭🏯 | 🛑➡️ | Usable |
| Multi-icon | Non-duplicated | | | 👥 | 🍴 | | | | | | 👥🍴 | |
| | Partially duplicated: Duplicated value = Unique value | ◇ | | | | | | ✈ | ⛵🚢 | | | |
| | Partially duplicated: Duplicated value ≠ Unique value | | ⛵ | | | 🚢⛵✈ | | | | | ◇ | Unusable |
| | Entirely duplicated | 🦅🦈 | | | ☁️⛅ | 🦅☁️⛅ | ← | | | | | |

Fig. 12

AUTHENTICATION METHOD USING ICON PASSWORD

BACKGROUND OF THE INVENTION

1. Field of the Invention

The present invention relates to a method of authenticating a user of a terminal operating a server and connected to the server through a communication network, in which a password needed for authentication is inputted as icons, rather than numerals or characters, thereby preventing leakage or theft of the password.

2. Background of the Related Art

Along with the advancements of electronic communication networks such as the Internet and mobile communications, electronic transactions are performed in a variety of areas including commercial businesses, banking, administrative affairs, communications and the like. Accordingly, a variety of authentication techniques have been developed and used for security of transactions.

In authentication techniques for electronic transactions performed through the electronic communication networks, a password may be regarded as the most common and essential element. The password may be practically a unique authentication means in an electronic transaction where face-to-face meeting between an authentication subject and an authentication object is excluded.

A password for an electronic transaction is generally configured as a numeric string, a character string, or a mixture of these strings. A user inputs the password by manipulating a keyboard or keypad of a terminal such as a computer, a mobile communication device, an automatic teller machine (ATM) or the like.

A password may be leaked through keyboard hacking or wiretapping in the process of inputting and transmitting the password by manipulating a keyboard or a keypad, and thus methods have been developed which can implement an input screen in the form of a keyboard or a keypad on a display of a terminal and input a password using a mouse or a touch screen.

However, the authentication method described above commonly uses a password based on numerals or characters, and has two problems in that the process of inputting a password is exposed to third parties in the neighborhood, and the password is inevitably leaked by a hacking program when the screen is transmitted.

SUMMARY OF THE INVENTION

Accordingly, the present invention has been made in view of the above problems, and it is an object of the present invention to provide a method of authenticating a user of a terminal using an icon password, in which security is improved in processing a password in an information processing device or a communication network. Leakage of the password is fundamentally prevented in the process of inputting the password by a user, thereby securing reliability on the overall authentication process.

To accomplish the above object, according to an aspect of the invention, there is provided a method of authenticating a user of a terminal using an icon password, the terminal being connected to a server through an electronic communication network, wherein an icon database and an authentication database are connected to the server, the icon database storing a plurality of icons assigned with unique values and the authentication database storing authentication information including passwords of respective users. The method comprises: an authentication requesting step, allowing the terminal to request authentication to the server through the communication network; an icon retrieve step, allowing the server to retrieve unique values and icons corresponding to the unique values from the icon database; an assigned value creation step, allowing the server to create the same number of assigned values as the retrieved unique values for each icon through a non-duplicate random number generation; an icon transmission step, allowing the server to transmit icon information containing the assigned values to the terminal through the communication network; an input waiting step, allowing the terminal to implement a password input screen based on the transmitted icon information; an input step, allowing the terminal to transmit authentication information containing assigned values of the selected icons to the server through the communication network; a conversion step, allowing the server to convert the assigned values contained in the transmitted authentication information to corresponding unique values; an inquiry step, allowing the server to query the authentication database using authentication information converted from the assigned values; and an authentication step, allowing the server to accept the authentication request if the authentication information is valid.

In the method of authenticating a user, the icon database stores a plurality of icons assigned with the same unique value, and the server randomly extracts a unique value and an icon from a plurality of icons of the unique value in the icon database in the icon retrieve step. In the method of authenticating a user, in which the icon database stores a plurality of icons assigned with feature values, and the authentication database stores the authentication information including passwords and feature value lists of respective users, the icon retrieve step comprises: a list inquiry step allowing the server to retrieve the feature value list from the authentication database; an icon extraction step of allowing the server to randomly extract an icon having a unique value as a feature value from the icon database; and an icon selection step of re-performing the icon extraction step when the extracted icon is a multi-icon having a plurality of feature values, and a plurality of duplicated values among feature values of the extracted icon are contained in the feature value list, or when the extracted icon is a multi-icon, the duplicated value is singular, and the duplicated value does not coincide with the unique value, wherein the icon extraction step and the icon selection step are repeatedly performed for each unique value.

According to the present invention, security is improved in processing a password in an information processing device or a communication network.

Furthermore, leakage of the password is fundamentally prevented in the process of inputting the password by a user. Therefore, an effect of securing reliability on the overall authentication process may be obtained.

BRIEF DESCRIPTION OF THE DRAWINGS

FIG. 7 is a view showing an example of information stored in an icon database according to a modified embodiment of the present invention.

FIG. 8 is a view showing an example of information stored in the icon database of the present invention, assigned with feature values.

FIG. 9 is a view showing the multi-icon of FIG. 8.

FIG. 11 is a view showing a process of selecting icons of the present invention.

FIG. 12 is a view showing an example of an input screen using multi-icons of the present invention.

DETAILED DESCRIPTION OF THE PREFERRED EMBODIMENT

The detailed configuration of the invention will be hereafter described with reference to the accompanying drawings.

Figure 1:
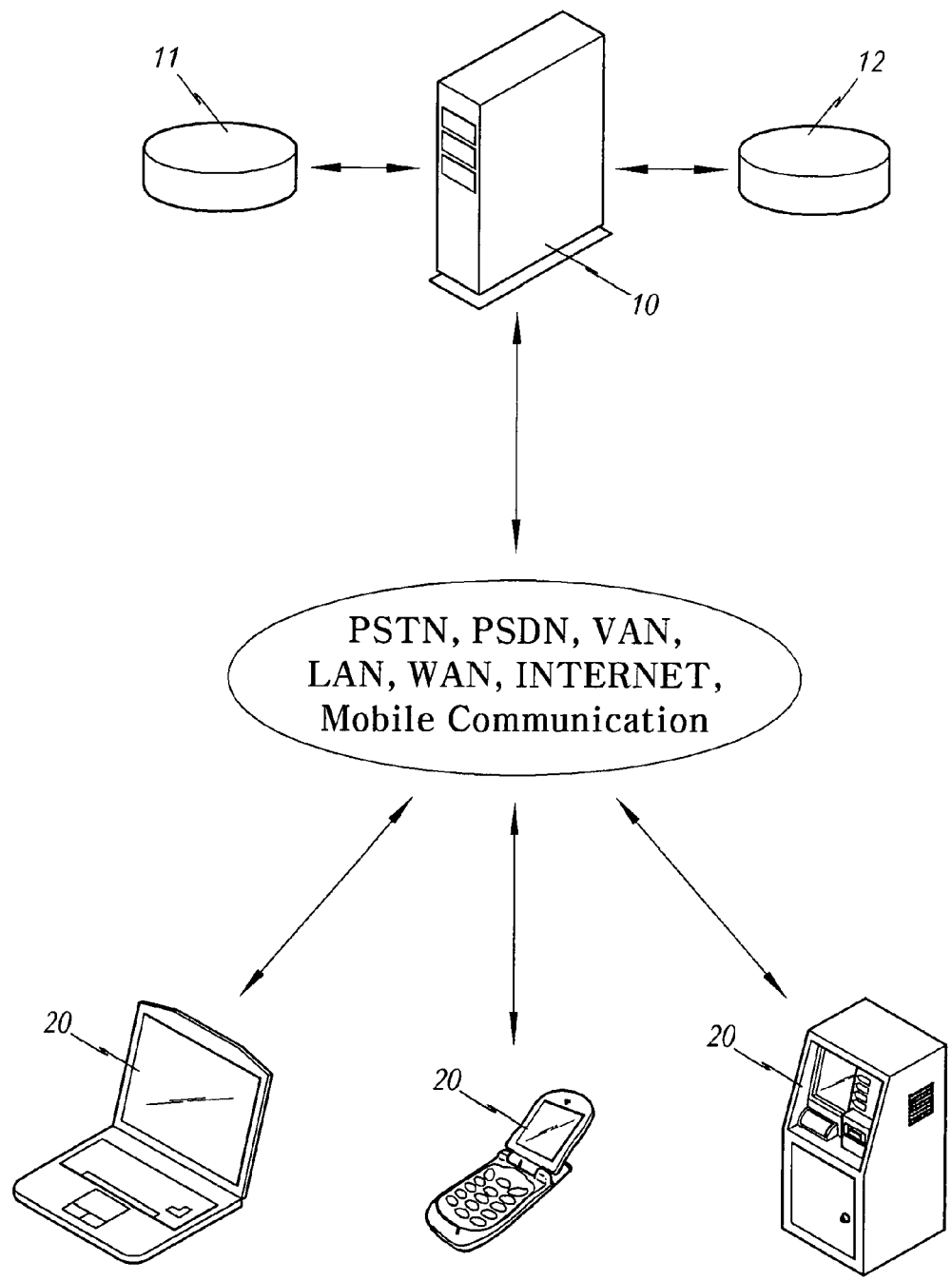
FIG. 1 shows a system configuration for performing the present invention.

First, FIG. 1 shows constitutional components for performing the present invention, comprising a server 10 and terminals 20 connected through an electronic communication network, in addition to an icon database 11 and an authentication database 12 connected to the server 10.

Here, as shown in FIG. 1, the communication network may include a public switched telephone network (PSTN), a public switched data network (PSDN), a value added network (VAN), a local area network (LAN), a wide area network (WAN), the Internet, a mobile communication network, and the like. The communication networks listed above may not be an individual concept that can be physically and clearly distinguished. Since the present invention relates to a technique of authenticating a user, not to the configuration of the electronic communication network itself, or a technique of distributing information itself, claims on the electronic communication network are not specifically limited.

In the present invention, a variety of electronic devices having an input and output means, such as a computer, a mobile communication device, an ATM, or the like, may be used as the terminal 20. As specific examples, the terminal may be a computer connected to the Internet through a modem and the PSTN or through a wired or wireless LAN, a cellular phone connected to the mobile communication network as a mobile station, a private ATM connected to the VAN, an ATM connected to a financial wide area network, and the like as shown in FIG. 1.

On the other hand, the icon database 11 for storing information related to icons for performing the present invention and the authentication database 12 for storing authentication information such as passwords of users are connected to the server to which the terminal 20 is connected through the electronic communication networks. The databases do not need to be physically separated from the server 10 and may be constructed within a memory device of the server 10.

That is, the databases of the present invention may be constructed in a variety of forms, such as being constructed in the memory device within the server 10 or constructed as a server 10 or storage located at a remote place. Connectivity between the server 10 and the databases shown in FIG. 1 is not limited to physical connectivity, but it means a logical connection between a server program performing authentication and the databases.

In addition, information stored in the databases may be encrypted to prevent hacking the server 10 or the databases or stealing by an operator. Since the encryption may be selectively performed by those skilled in the art, claims on the encryption are not specifically limited.

Figures 2, 3:
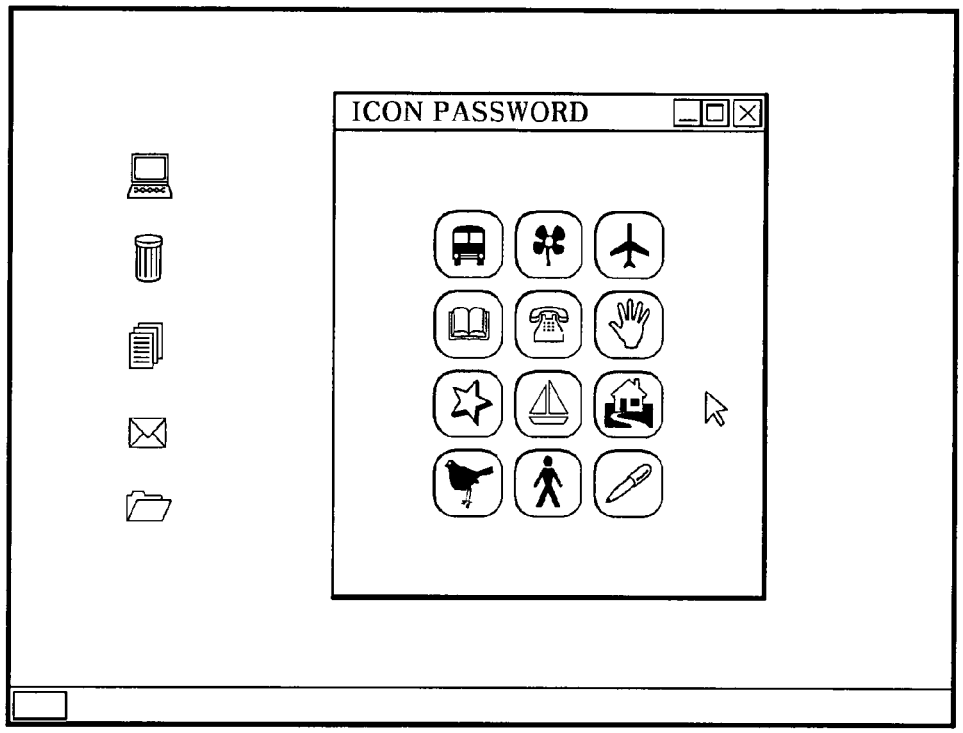
FIG. 2 is a view showing an example of an input screen of the present invention.
FIG. 3 is a view showing an example of information stored in an icon database of the present invention.

The present invention is fundamentally to shift away from a conventional numeral or character based password system. A password is configured not with a numeric string or a character string, but with a permutation or a combination of icons having identity. A password is inputted in a method of selecting icons configured on the screen of the terminal 20 as shown in FIG. 2.

That is, a user memorizes a password not as a numerical series such as "1, 2, 3, and 4", but as a permutation of icons such as "car, flower, plane, and book". On the other hand, a unique value is assigned to each of the icons as shown in FIG. 3 to process the icons electronically. Although integers and symbols the same as those of a telephone keypad are assigned to twelve icons in the embodiment shown in FIG. 3, various kinds of data other than the integers, such as characters, combinations of characters and numerals, or the like, may be assigned as unique values.

Here, the unique values are data assigned to respective icons to identify an icon in electronic data processing. Since a user recognizes only icons configuring a password and does not recognize unique values assigned to respective icons, the same number of assigned values as the unique values are created and transmitted to the terminal 20 in place of the unique values when icon information is transmitted to the terminal 20, and thus leakage of the unique values may be fundamentally prevented.

Figure 4:
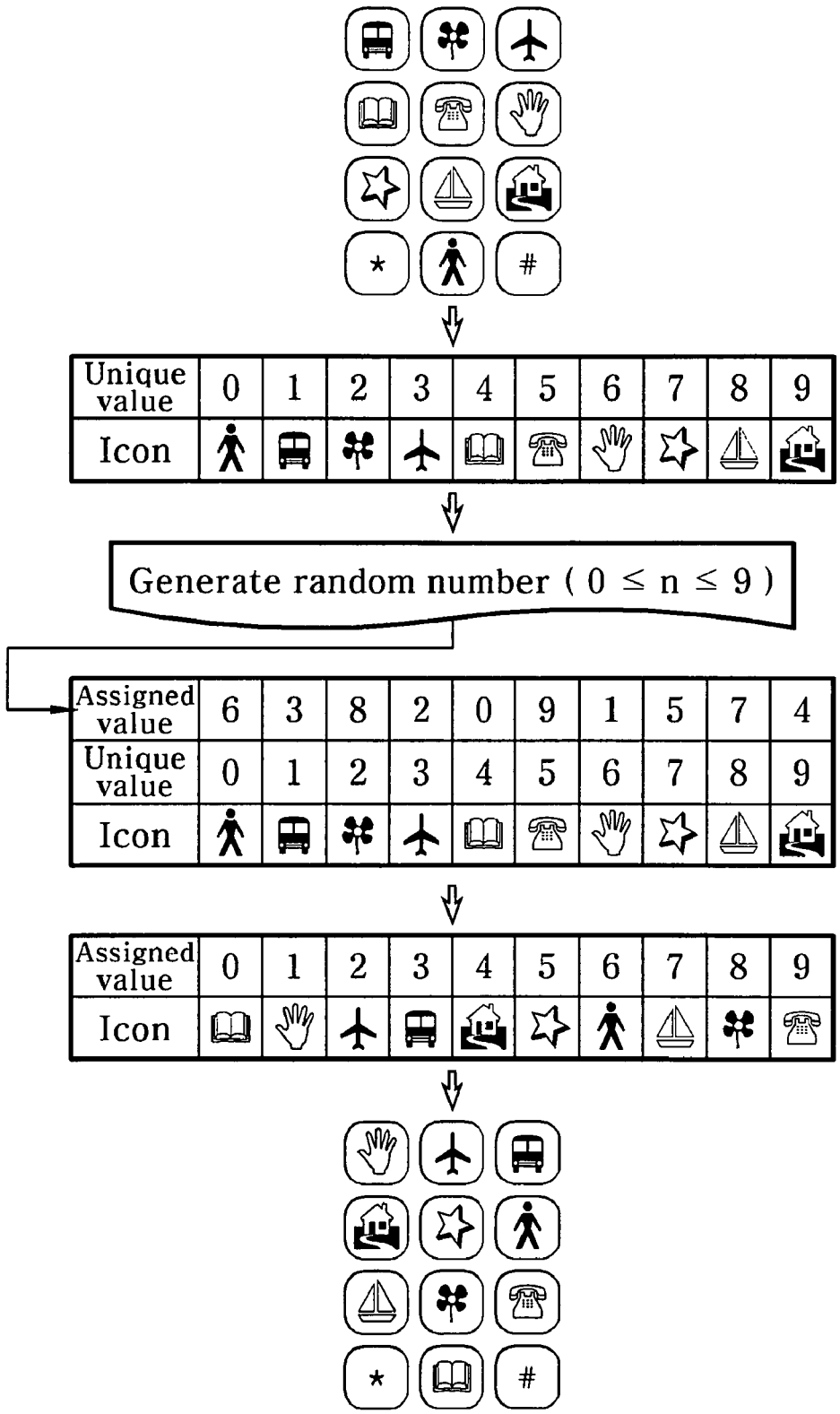
FIG. 4 is a view showing a process of implementing an input screen by applying assigned values of the present invention.

That is, the same number of non-duplicate random numbers as the unique values are created and assigned to respective icons as shown in FIG. 4, and icon information including the assigned values and the icons is transmitted to the terminal 20. Therefore, the unique values stored in the icon database 11 may be prevented from being leaked outside. Although transmission information can be stolen by wiretapping the electronic communication network, or input and output information can be stolen by a hacking program in the terminal 20, security of the password may be guaranteed since the original unique values of the icons may not be exposed.

In the embodiment shown in FIG. 4, integers from 0 to 9 are assigned as unique values, and each of the unique values specifies the location of a corresponding icon on the input screen. The assigned values are configured with the same number of integers from 0 to 9 as the unique values in the form of a changed order, through non-duplicate random number generation for generating integers in the range the same as that of the unique values.

The icon information comprising the assigned values created as such and icons is transmitted from the server 10 to the terminal 20, and the terminal receiving the icon information implements an input screen. In the embodiment shown in FIG. 4, the assigned values specify locations of icons on the input screen. As a result, a user inputs a password through the input screen configured in the form that is randomly changed each time.

Since the values assigned to respective icons as described above are non-duplicate random numbers that are the same as the unique values in the number, the assigned values correspond one-to-one to the unique values. Therefore, if a user input a password in a method of selecting icons and authentication information including the assigned values assigned to the selected icons are transmitted to the server 10, the server 10 converts the assigned values included in the authentication information to unique values based on the previously set correspondence relation, and accepts or rejects authentication by determining validity of the unique values.

Figure 5:
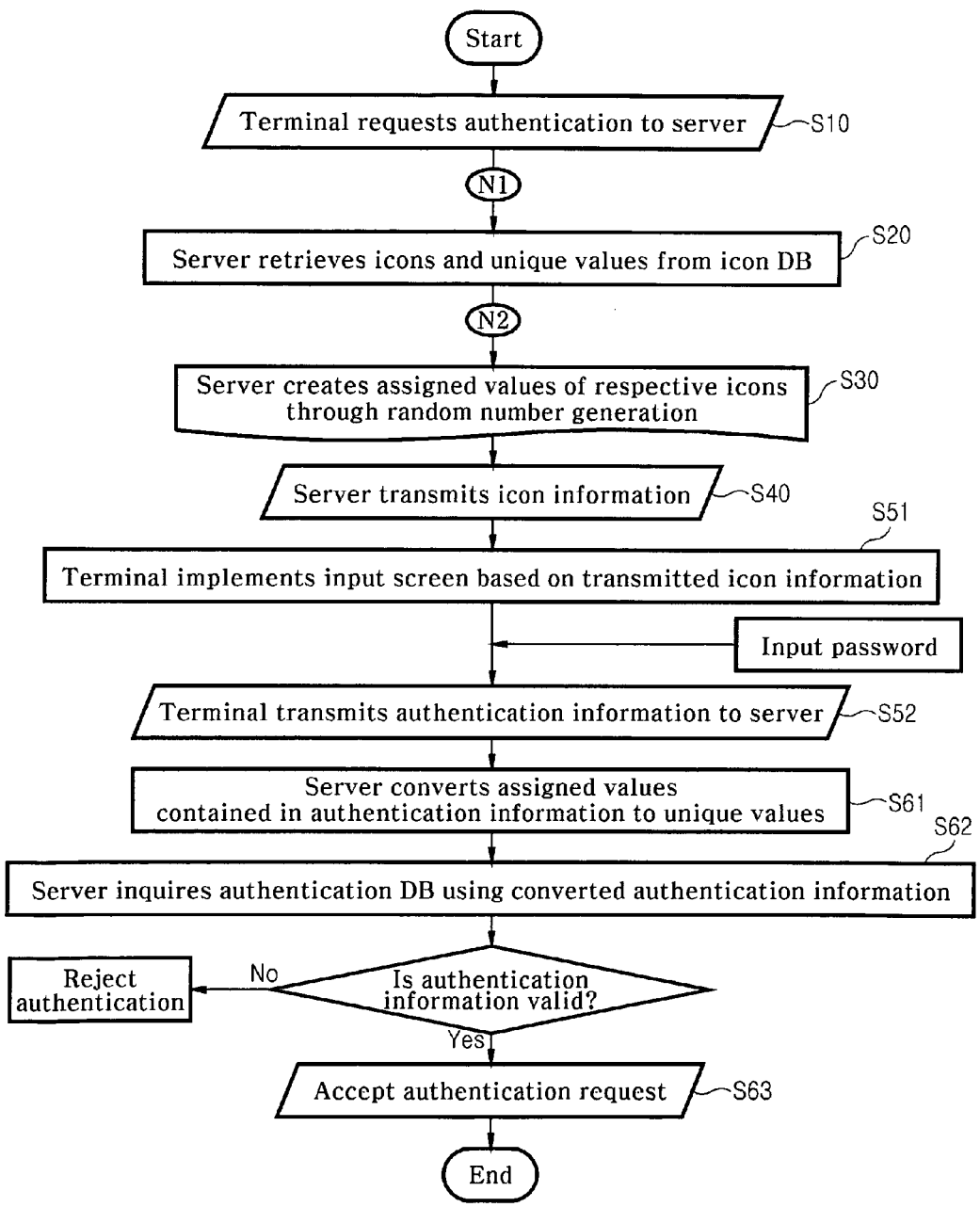
FIG. 5 is a flowchart illustrating the present invention.

FIG. 5 is a flowchart illustrating the present invention to which the icons, unique values, and assigned values are applied, which will be described below in detail.

First, the terminal 20 starts an authentication process of the present invention from the authentication request step S10 for requesting authentication to the server 10 through a communication network. As the authentication request is received, the server 10 performs the icon retrieve step S20 for retrieving unique values and icons respectively corresponding to the unique values from the icon database 11.

The icon database 11 stores unique values and icons corresponding to the unique values. An icon may simply correspond to a unique value as shown in FIG. 3, or a plurality of icons may correspond to a unique value as shown in FIG. 7. In this case, icons assigned with the same unique value are configured to be recognized as icons having the same feature by users and distinguished from other icons.

As described, when the icon database 11 stores a plurality of icons assigned with the same unique value, the server 10 performs the icon retrieve step S20 by randomly extracting a unique value and an icon among a plurality of icons assigned to the unique value from the icon database 11. Accordingly, an input screen configured with icons of a variety of combinations may be implemented, and thus security may be ensured.

After completing the icon retrieve step S20, the server 10 performs the assigned value creation step S30 for creating the same number of assigned values as the retrieved unique values for each icon through non-duplicate random number generation and the icon transmission step S40 for transmitting icon information containing the assigned values to the terminal 20 through the communication network.

The icon information may contain information related to icons such as image data of the icons and the like, in addition to the assigned values, which are essential elements. The configuration of such icon information may be changed depending on communication loads or characteristics of the electronic communication network. If the image data of icons are not contained in the icon information, an input screen may be implemented in a method of storing image data of icons in a storage device of the terminal 20 and transmitting icon information containing information for identifying images of icons.

The terminal 20 receiving the icon information performs the input waiting step S51 for implementing a password input screen based on the transmitted icon information. Then, if a user selects icons corresponding to a password, the terminal 20 performs the input step S52 for transmitting authentication information containing assigned values of the selected icons to the server 10 through the communication network. The user inputs the password by selecting icons using a mouse, a touch screen, or the like.

When the server 10 receives the authentication information containing identification of the user, the icon password, i.e., the assigned values, and the like, the server 10 performs the conversion step S61 for converting the assigned values contained in the authentication information to corresponding unique values. Then, the server 10 authenticates the user through the inquiry step S62 for querying the authentication database 12 using the authentication information converted from the assigned values, and the authentication step S63 for accepting the authentication request if the authentication information is valid.

Figure 6:
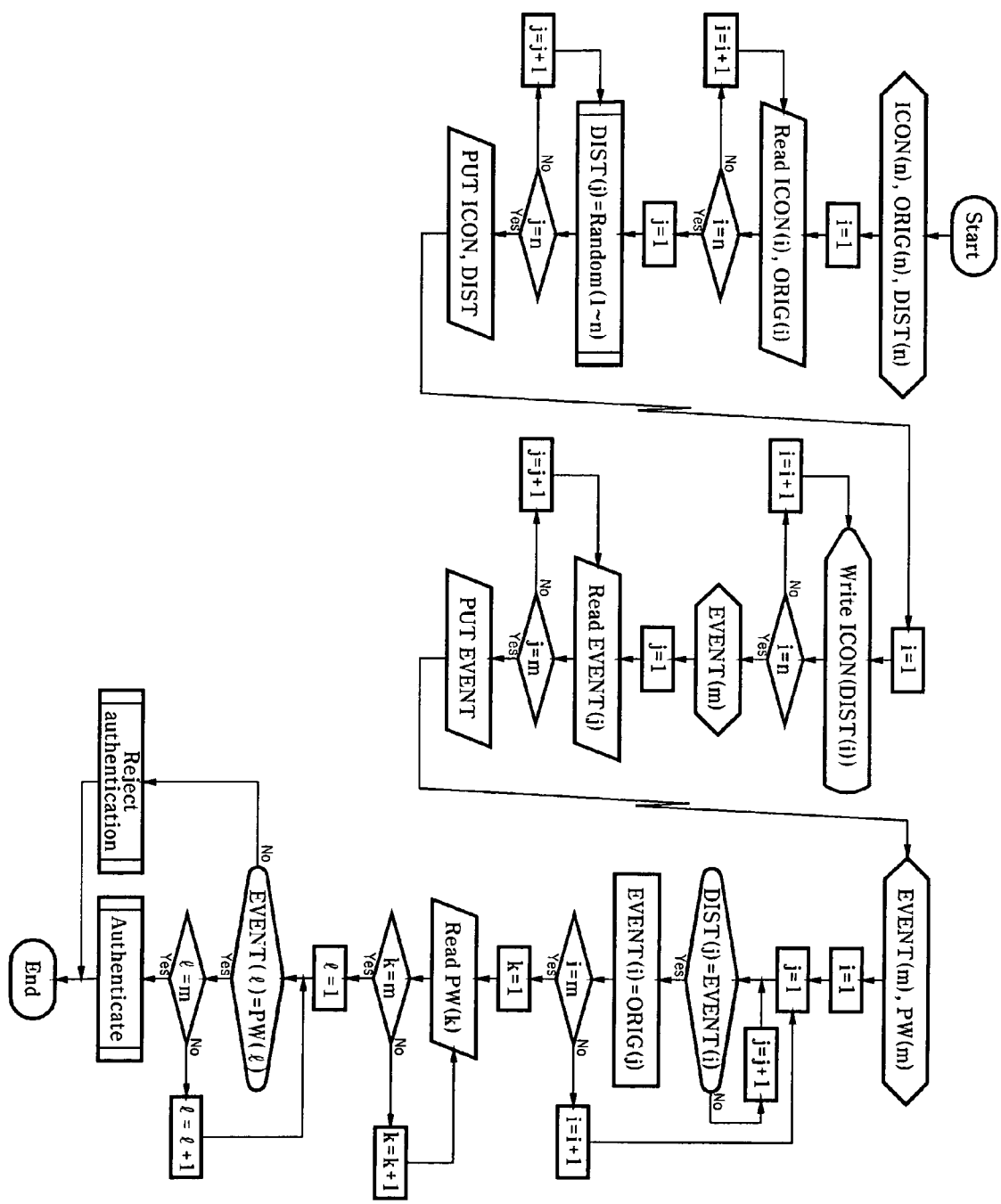
FIG. 6 is a flowchart illustrating the steps of processing a computer program of the present invention.

FIG. 6 is a flowchart illustrating the steps of processing a computer program to perform the present invention. In the embodiment of the figure, array variables of "ICON", "ORIG", and "DIST" respectively having n elements are declared, and the variables are respectively used for icons, unique values, and assigned values. Although the icons, unique values, and assigned values are expressed as array variables in the embodiment, which means that certain memory capacities are allocated for electronic data processing, they are not limited to variables of mathematical meanings, but may have different constellations such as image data, numerals, characters, or the like.

The flowchart shown in FIG. 6 is configured in three parts of left, middle, and right based on the process of transmitting and receiving a password through the electronic communication network. The three parts show the processes sequentially performed by the server 10, the terminal 20, and the server 10. In the steps of the middle part performed by the terminal 20 and the steps of the right part performed by the server 10, "EVENT" and "PW" are declared as array variables having m elements, and these variables respectively correspond to the icons selected by a user and a password of the user stored in the authentication database 12.

On other hand, since icons constructing a password in the present invention are featured in that an icon may be recognized as a plurality of meanings unlike a numeral or a character, security in the authentication process may be enhanced through such a multi-icon. If a feature value is assigned to icons depending on internal meaning of the icons as shown in FIG. 8, multi-icons having a plurality of feature values may be derived as shown in FIG. 9. If such feature values are stored in the icon database 11 together with icons and used in implementing a password input screen, input intention of a user may not revealed although all the icons selected in the process of inputting a password are exposed.

That is, icons themselves are not used as a password, but meanings of the icons assigned with feature values are used as a password. In the embodiment to which the icons of FIG. 8 are applied, a user does not memorize a password as a permutation of icons, but as a permutation of features such as "animal, plant, human, and food".

Figure 10:
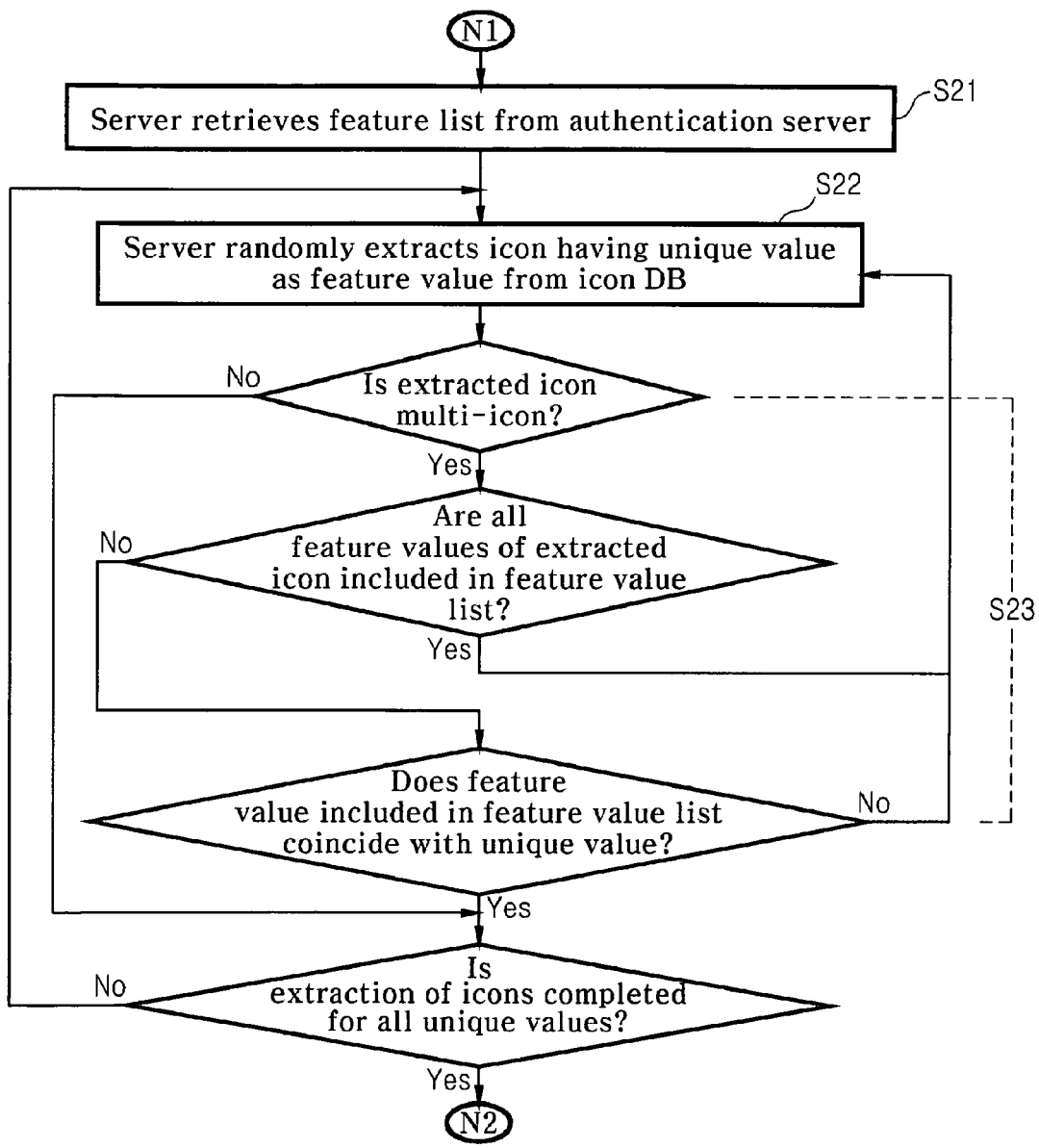
FIG. 10 is a flowchart illustrating the steps of retrieving icons in an embodiment of the present invention to which multi-icons are applied.

However, since the user may be confused due to multi-icons in the process of selecting icons, needed icons are retrieved and an input screen is implemented through the process shown in FIGS. 10 and 11 to allow the user to correctly input a password.

Since icons for constructing a password input screen should be selected depending on a password of the user when the multi-icons are applied as described, a process of querying a feature value list constructing a password should be preceded before the needed icons are extracted from the icon database 11. Here, the feature value list is a combination of feature values configuring a password. If a password is a permutation of feature values, the feature value list is a combination of corresponding feature values. Since a permutation of feature values corresponding to a feature value list has a plurality of numbers of cases, it is advantageous for security to retrieve the feature value list instead of directly retrieving a password in the icon retrieve step S20, i.e., in the initial stage.

FIG. 11 shows an example of selecting icons to be used for a password input screen when a user memorizes a password as "weather, animal, sea, and sky" in an embodiment to which the icon database 11 formed as shown in FIG. 8 is applied, i.e., when a password expressed in feature values is "4, 0, 7, and 6". The selection of icons will be described below based on the steps shown in the flowchart of FIG. 10.

First, the server 10 performs the list inquiry step S21 for retrieving a feature value list of a corresponding user from the authentication database 12 and the icon extraction step S22 for randomly extracting an icon having a certain unique value as a feature value from the icon database 11.

At this point, if the icon extracted in the icon extraction step S22 is a multi-icon having a plurality of feature values, and a plurality of duplicated values among the feature values of the extracted icon are contained in the feature value list, or if the extracted icon is a multi-icon, the duplicated value is singular, and the duplicated value does not coincide with the unique value, the icon selection step S23 of re-performing the icon extraction step S22 is performed.

Here, the icon extraction step S22 and the icon selection step S23 are repeatedly performed for each unique value, and finally, the same number icons as the unique values are determined.

FIG. 12 shows an example of an input screen implemented by the embodiment shown in FIG. 11. If a user selects icons meaning "weather, animal, sea, and sky", which are the user's password, unique values of "4, 0, 7, and 6" corresponding to the selected icons are transmitted as a password. In this case, since two of the selected icons are multi-icons, the number of cases of the password becomes 3 as shown in the figure.

As described above, through the icon password system of the present invention in which numerals and characters are excluded, further superior security may be achieved compared with a conventional numeral and character based password, and a further improved security effect may be obtained if the assigned values and multi-icons described above are used together.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of authenticating a user of a terminal using an icon password, the method comprising:
   requesting an authentication to a server through an electronic communication network, wherein the terminal is connected to the server through the electronic communication network, and an icon database and an authentication database are connected to the server, the icon database configured to store a plurality of icons, each icon assigned a same unique value, and the authentication database storing authentication information containing passwords associated with users;
   retrieving a plurality of unique values, wherein each unique value corresponds to a different icon of the plurality of icons;
   assigning a second value to each unique value of the plurality of unique values, through a non-duplicate random number generation;
   transmitting icon information containing each assigned second value for each unique value of the plurality of unique values and each corresponding icon for each unique value of the plurality of unique values to the terminal through the electronic communication network;
   implementing a password input screen based on the transmitted icon information, wherein each assigned second value indicates where each icon corresponding to each unique value is to be displayed on the password input screen;
   displaying only each icon transmitted in the icon information on the password input screen in a location indicated by each icon's assigned second value;
   transmitting authentication information containing each assigned second value associated with each icon selected by a user on the password input screen to the server through the electronic communication network;
   converting each assigned second value contained in the transmitted authentication information to its corresponding unique value;
   querying the authentication database using authentication information converted from each assigned second value; and
   accepting the authentication request in response to the authentication information being valid,
   wherein the server randomly extracts the same unique value and one icon among the plurality of icons assigned to the same unique value from the icon database for an icon retrieving process.

2. The method according to claim 1, wherein said icon retrieving process further comprising:
   querying and retrieving a list of feature values from the authentication database;
   randomly extracting an icon where each unique value of the plurality of unique values associated with each icon of the plurality of icons is a feature value from the icon database;
   selecting an icon for re-performing the icon extraction step,
      when the extracted icon is a multi-icon having a plurality of feature values and a plurality of duplicated values among feature values of the extracted icon are contained in the feature value list, or
      when the extracted icon is a multi-icon, a duplicated value is singular, and the duplicated value does not coincide with a unique value of the plurality of unique values; and
   repeatedly performing the icon extraction step and the icon selection step for each unique value of the plurality of unique values.

3. The method accordingly to claim 1, wherein the user inputs the icon password by selecting a sequence of icons on the password input screen with a mouse or touch screen.

4. A method comprising:
   requesting, by a terminal, an authentication to a server through an electronic communication network, wherein an icon database and an authentication database are connected to the server, the icon database storing a plurality of icons, each icon assigned a same unique value, and the authentication database storing authentication information containing passwords associated with users;
   receiving, by the terminal, icon information containing an assigned second value for each unique value assigned to each icon of the plurality of icons and each icon assigned to each unique value;
   implementing, by the terminal, a password input screen based on the transmitted icon information, wherein each assigned second value indicates where each icon corresponding to each unique value is to be displayed on the password input screen;
   displaying, by the terminal, only each icon transmitted in the icon information on the password input screen in a location indicated by each icon's assigned second value;
   transmitting, by the terminal, authentication information containing each assigned second value associated with each icon selected by a user on the password input screen to the server through the electronic communication network; and
   receiving, by the terminal, authentication in response to the authentication information being valid, wherein the server randomly extracts the same unique value and one icon among the plurality of icons assigned to the same unique value from the icon database for an icon retrieving process.

5. A method comprising:

receiving, by a server, an authentication from a terminal via an electronic communication network, wherein an icon database and an authentication database are connected to the server, the icon database storing a plurality of icons, each icon assigned a same unique value, and the authentication database storing authentication information including passwords associated with users;

retrieving, by the server, a plurality of unique values, wherein each unique value corresponds to a different icon of the plurality of icons;

assigning, by a server, a second value to each unique value of the plurality of unique values;

transmitting, by the server, icon information containing each assigned second value for each unique value of the plurality of unique values and each corresponding icon for each unique value of the plurality of unique values to the terminal through the electronic communication network, wherein each assigned second value indicates where each icon corresponding to each unique value is to be displayed on a password input screen on the terminal and wherein only each icon transmitted in the icon information is displayed on the password input screen in a location indicated by each icon's assigned second value;

receiving, by the server, authentication information containing each assigned second value associated with each icon selected by a user on the password input screen to the server through the electronic communication network;

converting, by the server, each assigned second value contained in the transmitted authentication information to its corresponding unique value;

querying, by the server, the authentication database using authentication information converted from each assigned second value; and accepting, by the server, the authentication request in response to the authentication information being valid, wherein the server randomly extracts the same unique value and one icon among the plurality of icons assigned to the same unique value from the icon database for an icon retrieving process.

\* \* \* \* \*